Feb. 20, 1923.

W. A. HARTY ET AL 1,445,943

METHOD OF TREATING METALLURGICAL PRODUCTS

Filed July 1, 1920   2 sheets-sheet 1

Feb. 20, 1923.　　　　　　　　　　　　　　　1,445,943
W. A. HARTY ET AL
METHOD OF TREATING METALLURGICAL PRODUCTS
Filed July 1, 1920　　　　2 sheets-sheet 2
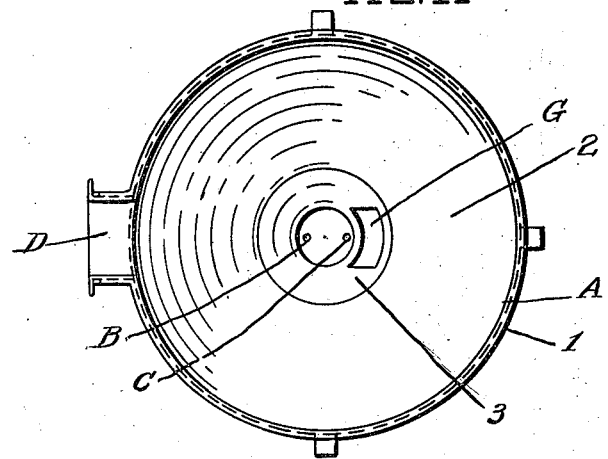
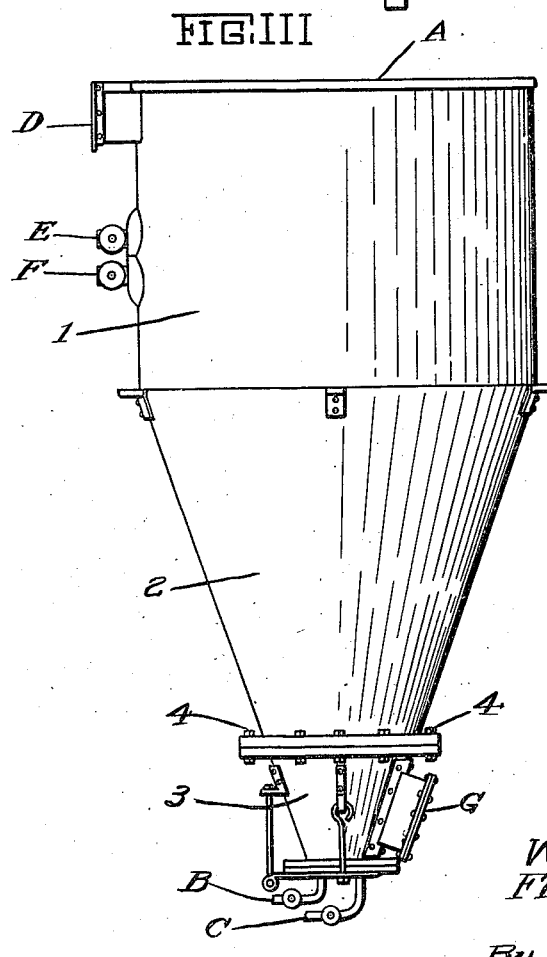
Inventor
William A. Harty
Frank W. Moore
By Ellis Spear Jr.
Attorney Patented Feb. 20, 1923.

1,445,943

UNITED STATES PATENT OFFICE.

WILLIAM A. HARTY, OF BUFFALO, NEW YORK, AND FRANK W. MOORE, OF THOROLD, ONTARIO, CANADA.

METHOD OF TREATING METALLURGICAL PRODUCTS.

Application filed July 1, 1920. Serial No. 393,272.

*To all whom it may concern:*

Be it known that we, WILLIAM A. HARTY, a citizen of the United States, and FRANK W. MOORE, a subject of George V, King of England, residing at Buffalo, county of Erie, State of New York, and Thorold, Province of Ontario, Dominion of Canada, have invented certain new and useful Improvements in Methods of Treating Metallurgical Products, of which the following is a specification.

The subject matter of the present invention involves a method of and apparatus for the removal of surface impurities and other objectionable elements in materials to be treated. While capable of use with a variety of materials, our invention is particularly adapted for treatment of electrometallurgical products, especially silicon carbide, and for the purposes of application we shall accordingly discuss it in the treatment of this material. It will be understood, however, that such discussion is purely illustrative and in no way limiting.

Heretofore the common practise in the chemical treatment and washing of silicon carbide to remove surface impurities, iron, silicon, aluminum and graphite from the crude silicon carbide has been to place the silicon carbide grain, after being reduced by crushing, in circular lead-lined tanks containing a solution of sulphuric acid and water. This solution is kept warm by steam coils in the tanks and the grain is allowed to soak in the solution for about sixty hours, during which period graphite and some of the other impurities rise to the top of the solution and are floated off, whereupon the tank is emptied by washing out the entire mass into a flight or screw or rotary washer, where the mass receives a water washing for the removal of the sulphuric acid. In this washing a considerable portion of the very fine silicon carbide powder is carried away and while some of this can be collected in settling tanks, there is none the less a considerable loss.

To the end, therefore, of avoiding this loss and of increasing the efficiency of the treatment by reducing to a very considerable extent the time required to carry out the process, we have devised our present invention. In it we provide for treating the material with acid and washing the treated material to remove all traces of the acid in the same tank, thus avoiding the second handling of the material in a supplementary washer, with consequent loss of the fine silicon carbide powder. We have also provided for agitating the mass during the acid treatment whereby to afford the acid an excellent opportunity to attack the surface impurities on the various grains and thus to reduce by a very considerable amount the length of time necessary for the treatment.

We have illustrated in the accompanying drawings a selected embodiment of a washing machine for the practise of our invention.

In these drawings:

Fig. I is a diagram showing the manner of practising our invention.

Fig. II is a plan view of apparatus for practise of our invention.

Fig. III is a side elevation thereof.

The washer consists of a sectional tank comprising the sections 1, 2, and 3, the top section 1 being circular and sections marked 2 and 3 being conical. The tank sections are made of iron or steel and are lined with lead as a protection against acid. In order to facilitate the lining of the bottom section 3 and to permit ready access for purposes of repair or replacement the section 3 is detachably secured to the section 2 as by the bolts 4.

In use the tank is first partially filled with water and the silicon carbide grains or other material to be treated are introduced therein from above as indicated at A. Live steam is then introduced into the tank from below through the steam pipe B which enters the lowermost tank section 3 and the tank contents are kept steaming hot. Sulphuric acid or any other appropriate agent for the removal of the surface impurities of the grains, is then introduced into the hot mass which is at the same time subjected to a thorough agitation by the introduction of compressed air from below into the tank through the pipe C which enters the tank section 3 from below. The amount of compressed air admitted depends upon the amount of agitation which is considered desirable. The result of agitation of the mass insures that the sulphuric acid will attack the surface impurities on the various grains, resulting in a superior cleansing of the grains and shortening the time for treatment to a very considerable extent. Experiments with our invention indicate excellent results with a ten hour treatment of the material as compared with a treatment of sixty hours under the old method.

After this acid treatment has been completed, the tank is flooded with water which may also be introduced through the pipe C until the water reaches the level of the overflow D where the graphite is floated off. Ten or fifteen minutes is then allowed for settling, after which the solution is brought down to the levels E or F by discharge through these outlets, whereupon the outlets are closed and the mass is again agitated while the water is being introduced for the washing off of the sulphuric acid. This washing is continued until all trace of acid has been removed, after which the mass is discharged through the gate G onto a drain board from which it is shoveled into driers. The pipes B and C are provided with valves to prevent the material backing up into these pipes.

Our invention thus permits both the acid treatment and the washing to remove the acid, to be performed in a single machine and in a much shorter period of time and with increased efficiency as compared with the usual method. Furthermore, it is possible with our invention to give the material additional chemical treatment, as for example, the alkali treatment which is very desirable for some purposes in connection with silicon carbide, but which under the usual method was a source of trouble and delay because of the necessity of additional handling of the material.

While we have indicated only a single specific instance of the manner of practise of our invention, it will be understood that the invention is capable of a variety of uses and that the specification and claims shall be construed.

Various modifications in the manner of practising our invention and in the apparatus for carrying out our method may obviously be resorted to within the limits of the appended claims.

What we therefore claim and desire to secure by Letters Patent is:

1. The method of cleansing silicon carbide which consists in immersing the charge within a chamber in an acid bath, in draining said bath from the retained charge, in flooding said charge in said chamber with a rinse, in withdrawing said rinse, and in finally withdrawing and draining said charge.

2. The method of cleansing silicon carbide consisting in confining a charge in a chamber in a hot acid bath, in agitating the charge in said bath, in draining said bath from the retained charge, in flooding said charge in said chamber with a rinse, in agitating the charge in said rinse, in withdrawing said rinse, and in finally withdrawing and draining said charge.

3. The method of cleansing silicon carbide consisting in confining a charge in a chamber in a hot acid bath, in agitating the charge in said bath, in draining said bath from the retained charge, in flooding said charge in said chamber with a rinse, in agitating by ebullition the charge in said rinse, in withdrawing said rinse, and in finally withdrawing and draining said charge.

In testimony whereof we affix our signatures in presence of two witnesses.

WILLIAM A. HARTY.
FRANK W. MOORE.

Witnesses:
 CHARLES R. FLETCHER,
 STELLA M. McCLELLAND.